US007593793B2

United States Patent

(12) United States Patent
Lavretsky et al.

(10) Patent No.: US 7,593,793 B2
(45) Date of Patent: Sep. 22, 2009

(54) ADAPTIVE CONTROL IN THE PRESENCE OF INPUT CONSTRAINTS

(75) Inventors: Eugene Lavretsky, Los Angeles, CA (US); Naira Hovakimyan, Blacksburg, VA (US)

(73) Assignee: The Boeing Company, Chicago, IL (US)

( * ) Notice: Subject to any disclaimer, the term of this patent is extended or adjusted under 35 U.S.C. 154(b) by 876 days.

(21) Appl. No.: 10/997,548

(22) Filed: Nov. 24, 2004

(65) Prior Publication Data

US 2006/0027710 A1 Feb. 9, 2006

Related U.S. Application Data

(60) Provisional application No. 60/592,436, filed on Jul. 30, 2004.

(51) Int. Cl.
*G01C 23/00* (2006.01)

(52) U.S. Cl. .......................................................... 701/3

(58) Field of Classification Search ....................... None
See application file for complete search history.

(56) References Cited

U.S. PATENT DOCUMENTS

| | | | | |
|---|---|---|---|---|
| 4,355,358 | A * | 10/1982 | Clelford et al. | 701/3 |
| 4,536,843 | A * | 8/1985 | Lambregts | 701/3 |
| 6,062,513 | A * | 5/2000 | Lambregts | 244/175 |
| 6,338,454 | B1 * | 1/2002 | Rollet et al. | 244/17.13 |
| 6,648,269 | B2 * | 11/2003 | Gold et al. | 244/17.13 |
| 6,735,500 | B2 * | 5/2004 | Nicholas et al. | 701/3 |
| 6,928,340 | B2 * | 8/2005 | Van De Kreeke et al. | 701/4 |
| 2002/0022910 | A1 * | 2/2002 | Kubica et al. | 701/4 |
| 2003/0088341 | A1 * | 5/2003 | Jones et al. | 701/3 |

OTHER PUBLICATIONS

Lavretsky et al.; Positive μ-modification for Stabel Adaptation in the Presence of Input Constraints, Proceeding of the 2004 American Control Conference, Jun. 30-Jul. 2, 2004, pp. 2545-2550, Boeing Worldwide, Boston, Massachusetts.

* cited by examiner

*Primary Examiner*—Khoi Tran
*Assistant Examiner*—Nicholas Kiswanto
(74) *Attorney, Agent, or Firm*—Haynes & Boone, LLP.

(57) ABSTRACT

An adaptive control method is provided that scales both gain and commands to avoid input saturation. The input saturation occurs when a commanded input $u_c$ exceeds an achievable command limit of $u_{max}$. To avoid input saturation, the commanded input $u_c$ is modified according to a factor μ.

9 Claims, 6 Drawing Sheets

CONTROL INPUT: $\mu = 0$

COMMANDED
ACTUAL $u, u_c'$ 2
1.5
1
0.5
0
−0.5
−1
−1.5
−2

0 5 10 15 20 25 30 35 40 45 50

TIME ⟶

ADAPTIVE CONTROL IN THE PRESENCE OF INPUT CONSTRAINTS

CROSS-REFERENCE TO RELATED APPLICATIONS

This application claims the benefit of U.S. Provisional Application No. 60/592,436, filed Jul. 30, 2004, which is incorporated herein by reference in its entirety.

TECHNICAL FIELD

This invention relates generally to model reference adaptive control (MRAC) and more particularly to a direct adaptive control technology that adaptively changes both control gains and reference commands.

BACKGROUND

An adaptive model reference flight control loop is shown in FIG. 1. The flight control loop responds to a scalar reference input r provided by an external guidance system (not illustrated) or from guidance commands from a pilot. For example, an external guidance system may command a climb of a certain number of feet per second and scale input r accordingly. Aircraft 10 includes a set of actuators 15 that operate control surfaces on the aircraft in response to reference input r. In response to the actuation of the control surfaces, aircraft 10 will possess a certain state as measured by sensors 20, denoted by a state vector x. State vector x would include, for example, pitch, roll, and other standard sensor measurements. Similar measurements are provided by a reference model 50 for aircraft 10. Reference model 50 receives reference input r and generates a reference state $x_{ref}$ for aircraft 10 that would be expected in response to the flight control loop receiving reference input r.

An adaptive control system receives an error signal representing the difference between state vector x and reference state $x_{ref}$ and provides a linear feedback/feedforward input command $u_{lin}$. It may be shown that $u_{lin}$ is a function of the sum of the product of a state gain $k_x$ and the state vector x and the product of a reference gain $k_r$ and the scalar reference input r. Responsive to the measurement of vector x and a scalar reference input r, a baseline or nominal controller 30 generates a nominal control signal 35, $u_{lin\text{-}nominal}$. Unlike the adaptive gains used to form $u_{lin}$, $u_{lin\text{-}nominal}$ is the sum of the product of a static gain $k_{x0}$ and the state vector x and the product of a static gain $k_{r0}$ and the scalar reference input r. In that regard, a control loop topology could be constructed as entirely adaptive without any nominal control component such as baseline controller 30. However, the nominal control component will assist to "point in the right direction" such that the adaptive control may more quickly converge to a stable solution.

An input command $u_c$ is formed from the summation of $u_{lin}$ and $u_{lin\text{-}nominal}$. Responsive to the input command $u_c$, the appropriate control allocations amongst the various control surfaces are made in control allocation act 40 to provide commands to actuators 15. In turn, actuators 15 implement actual input command u. Under normal conditions, u and $u_c$ should be very similar or identical. However, there are limits to what control surfaces can achieve. For example, an elevator or rudder may only be deflectable to a certain limit. These limits for the various control surfaces may be denoted by an input command saturation limit, $u_{max}$. Thus, u can not exceed $u_{max}$ or be less than $-u_{max}$. If $u_c$ exceeds $u_{max}$, u will be saturated at limit $u_{max}$.

Conventional linear control such as that shown in FIG. 1 is typically fairly robust to small modeling errors. However, linear control techniques are not intended to accommodate significant unanticipated errors such as those that would occur in the event of control failure and/or a change in the system configuration resulting from battle damage. A common characteristic of conventional adaptive control algorithms is that physical limitations are encountered such as actuator displacement and rate limits such that u becomes saturated at $u_{max}$ or $-u_{max}$. This input saturation may lead to instability such that the aircraft crashes.

Although described with respect to a flight control system, many other types of adaptive control systems share this problem of input saturation. Accordingly, there is a need in the art for improved adaptive control techniques that explicitly accounts for and has the capability of completely avoiding input saturation.

SUMMARY

In accordance with an aspect of the invention, an adaptive control technique is provided in the presence of input constraints. For example, in an aircraft having actuators controlling control surfaces, the actuators may possess an input command saturation of $u_{max}$. Despite these limits, if the aircraft uses an adaptive or nominal control system, the control system may provide a linear feedback/feedforward commanded input of $u_{lin}$ that may exceed $u_{max}$ such that the actual command input realized by the actuators is satatturated at $u_{max}$. The following acts avoid such input saturation: defining a positive input command limit $u_{max}^{\delta}$ equaling $(u_{max}-\delta)$, where $0<\delta<u_{max}$; defining a negative input command limit equaling $-u_{max}^{\delta}$; if the absolute value of $u_{lin}$ is less than or equal to $u_{max}^{\delta}$, commanding the actuators with $u_{lin}$; if $u_{lin}$ exceeds $u_{max}^{\delta}$, commanding the actuators with a first command input that is a function of the sum of $u_{lin}$ and a scaled version of $u_{max}^{\delta}$; and if $u_{lin}$ is less than $-u_{max}^{\delta}$; commanding the actuators with a second command input that is a function of the difference of $u_{lin}$ and a scaled version of $u_{max}^{\delta}$.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
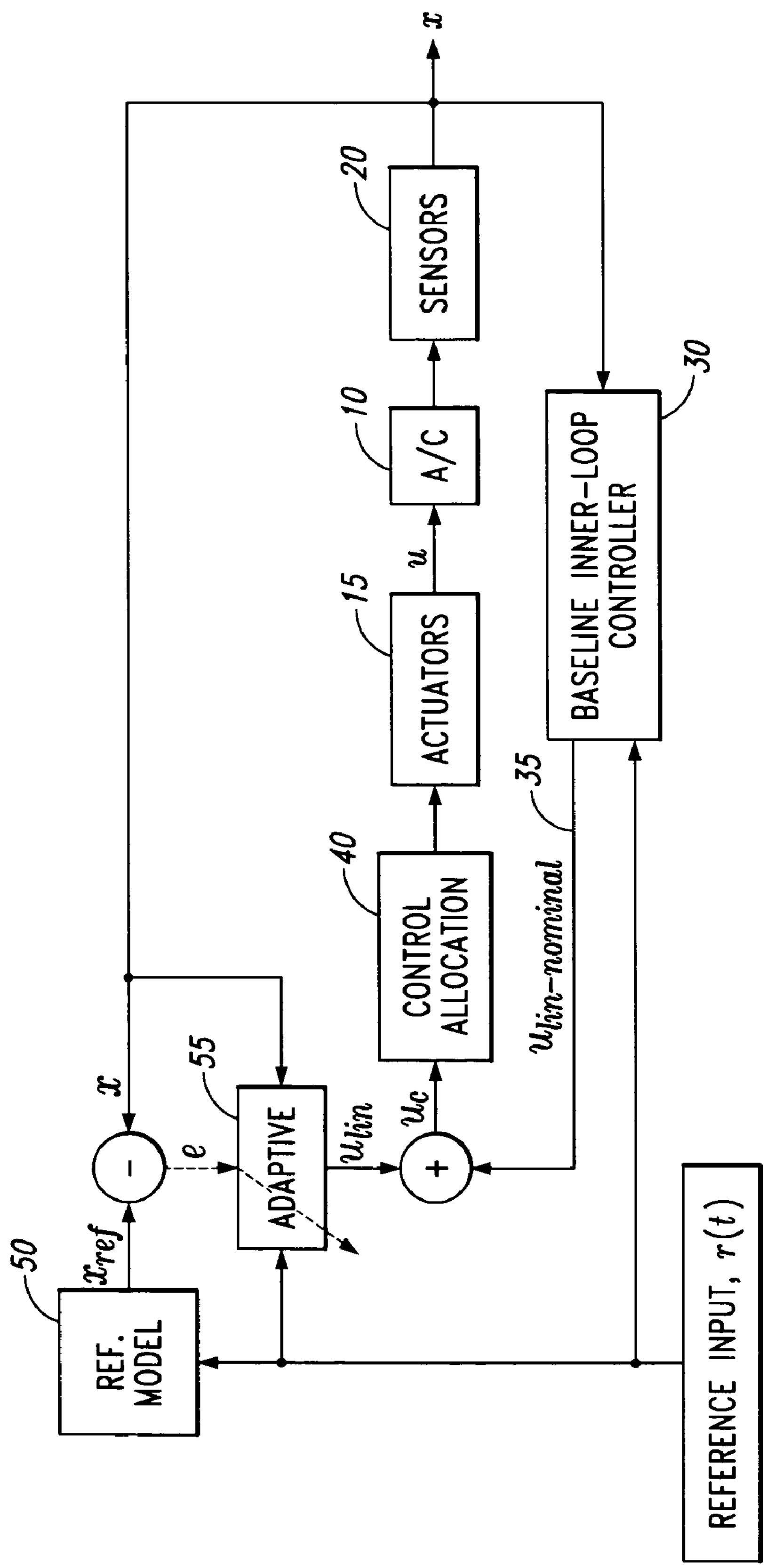
FIG. 1 is a block diagram of a conventional model reference flight control loop.

The present invention provides an adaptive control methodology that is stable in the sense of Lyapunov (theoretically proven stability), yet explicitly accounts for control constraints to completely avoid input saturation. This adaptive control methodology may be better understood with reference to the conventional flight control of FIG. 1. This control loop is described with respect to an aircraft 10. However, it will be appreciated that the adaptive control described herein has wide applications to any adaptive control loop implemented in a system that has input saturation. As discussed with respect to FIG. 1, aircraft 10 includes actuators 15 that respond to commanded inputs $u_c$ with an actual or achieved input u as discussed previously. In response to actual input u, aircraft 10 achieves a state x as measured by sensors 20. Given the state x and actual input commands u, an equation for model system dynamics is as follows:

$$\dot{x}(t)=Ax(t)+b\lambda u(t),\ x\in R^n, u\in R$$

where A is an unknown matrix, b is a known control direction, λ is an unknown positive constant, R is any real number, and $R^n$ is an n-dimensional vector.

Should there be no saturation of control surfaces, actual or achieved input commands u and the commanded input $u_c$ are identical. However, a typical control surface can only achieve a certain amount of deflection. For example, a rudder or elevator may only be deflectable through a certain angle or limit, which may be denoted as $u_{max}$. Thus, should $u_c$ exceed this limit, the actual input u will equal $u_{max}$. This relationship between $u_c$ and u may be represented mathematically as:

$$u(t)=u_{max}\ sat\left(\frac{u_c}{u_{max}}\right)=\begin{cases} u_c(t), & |u_c(t)|\le u_{max} \\ u_{max}\ sgn(u_c(t)), & |u_c(t)|\ge u_{max}\end{cases}$$

where $u_{max}$ is the saturation level. Based upon this relationship, the equation for the system dynamics may be rewritten as $$\dot{x}=Ax+b\lambda(u_c+\Delta u),\ \Delta u=u-u_c$$

Even if $u_c$ is limited to $u_{max}$ to avoid input saturation, it will be appreciated that u may approach $u_{max}$ too quickly such that undesired vibrations are incurred as u equals $u_{max}$. Accordingly, a new limit on actual command inputs is introduced as follows $$u_{max}^{\delta}=u_{max}-\delta,\ \text{where: } 0<\delta<u_{max}$$

A commanded control deficiency $\Delta u_c$ between the commanded input $u_c$ and the actual input may then be represented as $$\Delta u_c=u_{max}^{\delta}\ sat\left(\frac{u_c}{u_{max}^{\delta}}\right)-u_c$$

The present invention introduces a factor μ into the commanded input $u_c$ as follows:

$$u_c=\underbrace{k_x^T x+k_r r}_{\boxed{u_{lin}}}+\boxed{\mu\Delta u_c}$$

where $k_x$ and $k_r$ are the gains for the actual state x and the reference state r, respectively. As discussed with respect to FIG. 1, $u_{lin}$ may be entirely adaptive or possess a nominal component.

Note that $u_c$ is implicitly determined by the preceding two equations. It may be solved for explicitly as:

$$u_c=\frac{1}{1+\mu}\left(u_{lin}+\mu\ u_{max}^{\delta}\ sat\left(\frac{u_{lin}}{u_{max}^{\delta}}\right)\right)=\begin{cases} u_{lin}, & |u_{lin}|\le u_{max}^{\delta} \\ \frac{1}{1+\mu}(u_{lin}+\mu\ u_{max}^{\delta}), & u_{lin}>u_{max}^{\delta} \\ \frac{1}{1+\mu}(u_{lin}-\mu\ u_{max}^{\delta}), & u_{lin}<-u_{max}^{\delta}\end{cases} \quad \text{Eq. (1)}$$

It follows that $u_c$ is continuous in time but not continuously differentiable.

Figure 2:
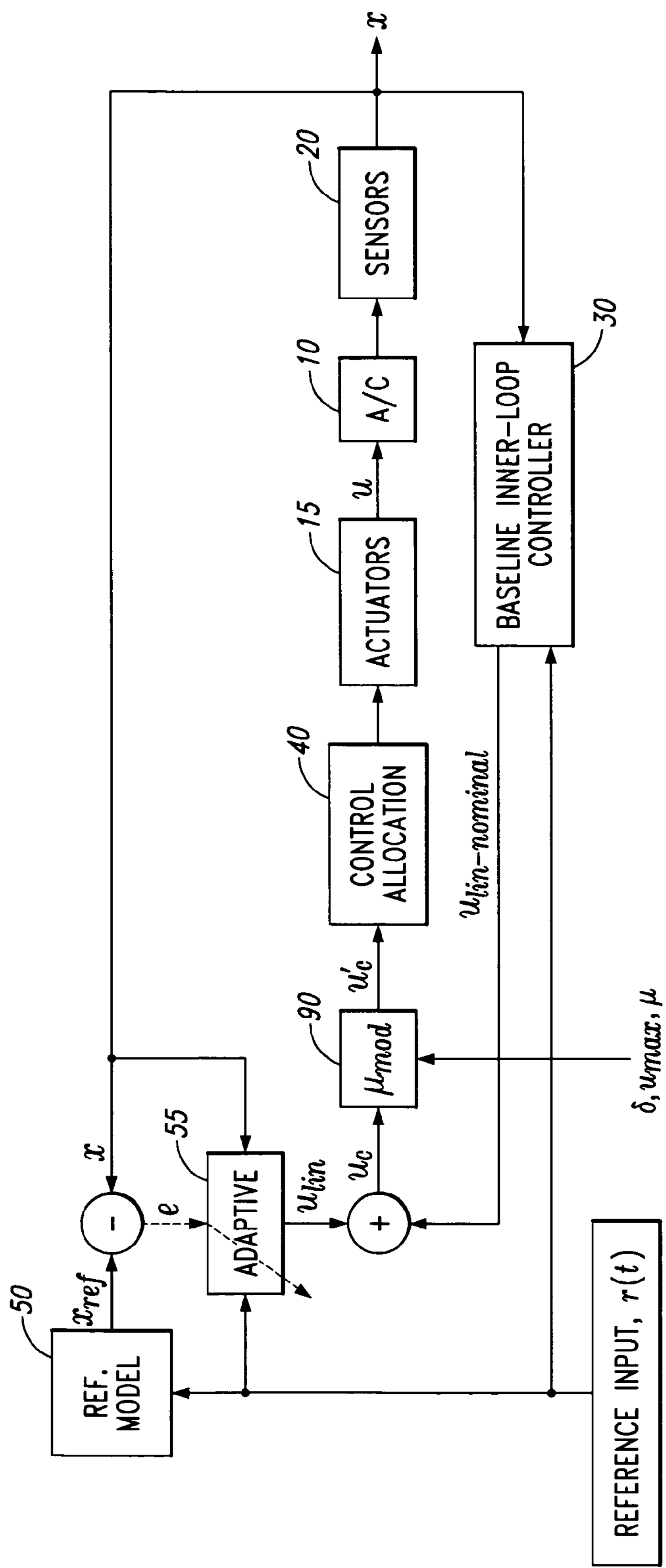
FIG. 2 is a block diagram of an adaptive flight control loop having a baseline controller in accordance with an embodiment of the invention.
Figure 3:
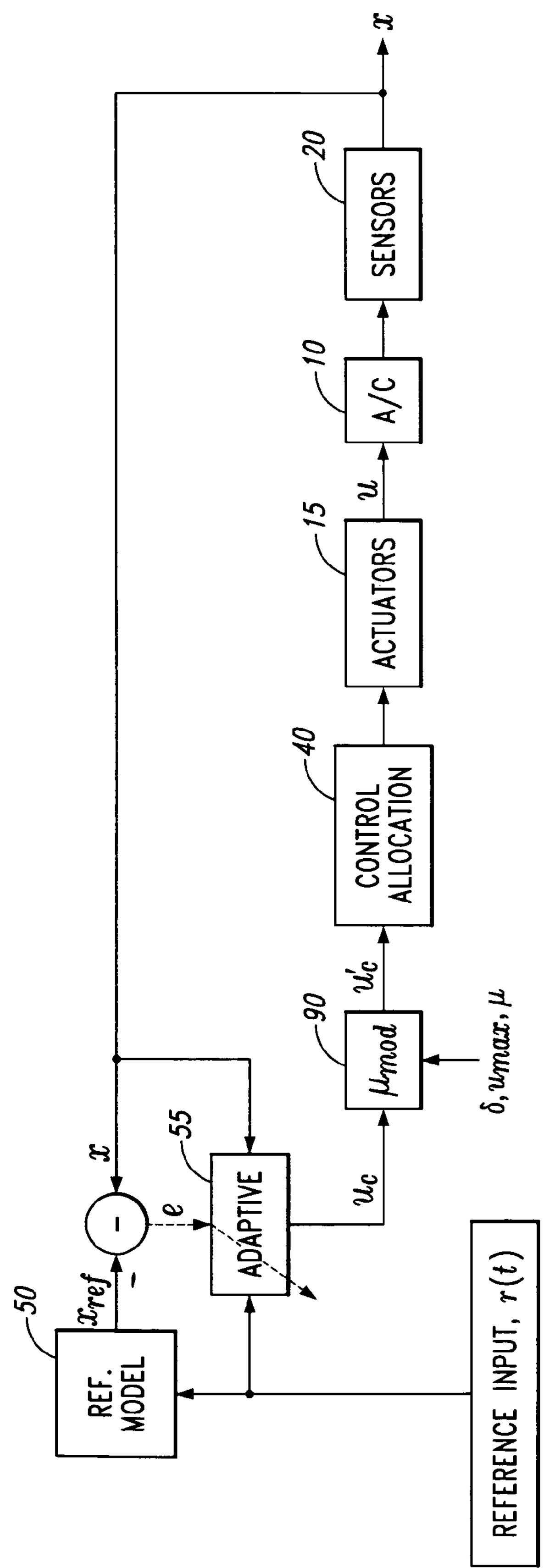
FIG. 3 is a block diagram of an entirely adaptive flight control loop in accordance with an embodiment of the invention.

To assure Lyapunov stability, it is sufficient to choose the factor μ as follows:

$$\mu>\frac{(\kappa+2\lambda\|Pb\|(\Delta k_x^{max}+\|k_x^*\|))u_{max}}{\kappa\delta}+\frac{(\Delta k_r^{max}+|k_r^*|)\kappa r_{max}}{\kappa\delta}-2$$

where $\Delta k_x^{max}$, $\Delta k_r^{max}$ are the maximum initial parameter errors, $k_x^*$, $k_r^*$ are parameters that define the ideal control law for achieving the desired reference model for the given unknown system, and κ is a constant that depends upon the unknown system parameters, Implementation of the factor μ within an adaptive flight control loop is shown in FIG. 2. A module 90 receives $u_c$ that is formed from the addition of $u_{lin}$, and $u_{lin\text{-}nominal}$ as discussed with respect to FIG. 1. The factors $u_{max}$, μ and δ discussed with respect to Equation (1) may be provided by an external system or stored within memory (not illustrated). Given these factors, module 90 examines $u_c$ and implements Equation (1) accordingly to provide a modified commanded input $u_c'$. From factors $u_{max}$ and δ, module 90 calculates $u_{max}^{\delta}$ so that $u_c$ may be compared to $u_{max}^{\delta}$. If the absolute value of $u_c$ (or equivalently, $u_{lin}$) is less than or equal to $u_{max}^{\delta}$, then module 90 provides $u_c$ as being equal to $u_c$. If, however, $u_c$ exceeds $u_{max}^{\delta}$ or is less than $-u_{max}^{\delta}$, module 90 provides $u_c'$ as being equal to the corresponding value from Equation (1). It will be appreciated that module 90 may be implemented within hardware, software, or a combination of hardware and software. Moreover, as seen in FIG. 3, module 90 may be implemented within an entirely adaptive control loop that does not possess a baseline controller 30.

Figure 4:
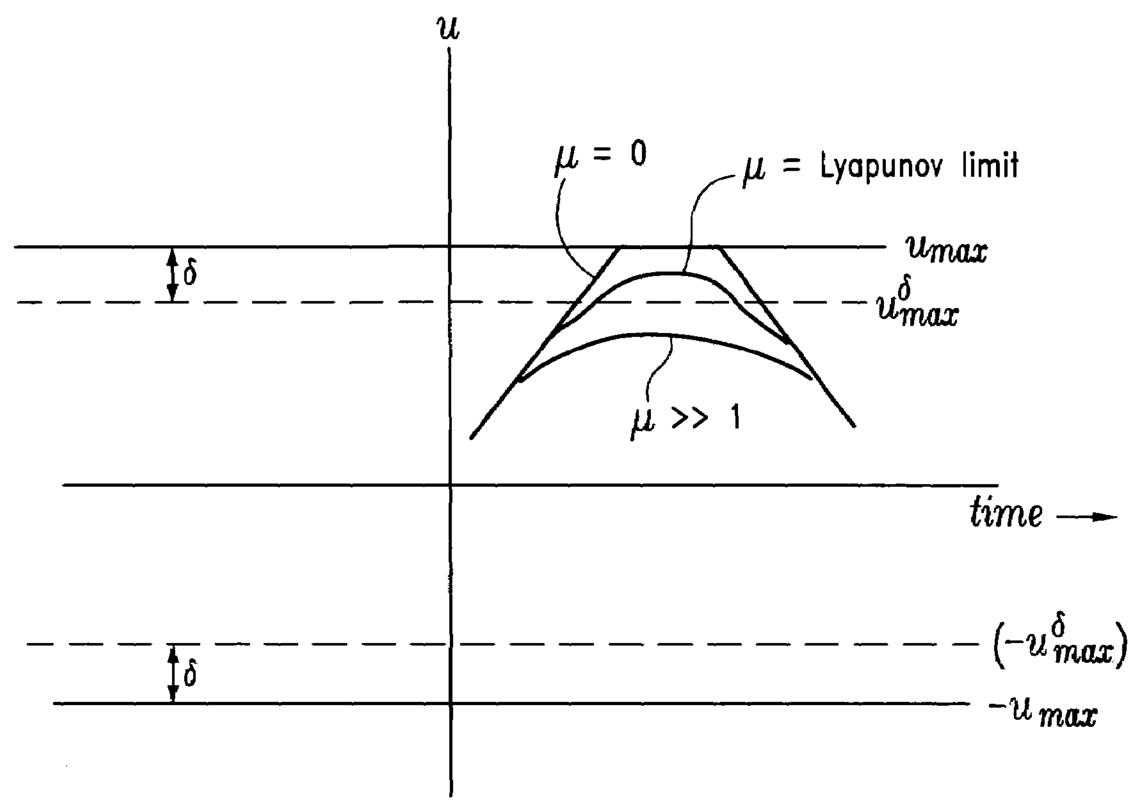
FIG. 4 is a plot of achieved input u as a function of time for a prior art adaptive control loop and an adaptive control loop having a non-zero μ factor in accordance with an embodiment of the invention.

A graphical illustration of the effect of module 90 with respect to the achieved command u and the saturation limits $u_{max}$ and $-u_{max}$ is illustrated in FIG. 4. Consider the case if the factor μ equals zero. Examination of Equation (1) and FIGS. 2 and 3 shows that for such a value of μ, the modified input command $u_c'$ will simply equal $u_c$. As discussed in the background section, the achieved input command u will thus saturate at $u_{max}$ as $u_c$ exceeds $u_{max}$. Such an input saturation may cause dangerous instability, leading to crashes or other undesirable effects. Conversely, if μ equals the minimum value required for Lyapunov stability as discussed above, the achieved input command u does not saturate, thereby eliminating input saturation effects. However, it will be appreciated from examination of Equation (1) that the factor μ may not simply be set to an arbitrarily high value much greater than 1. In such a case, the achieved control u becomes overly conservative with respect to the available control limits so that the resulting tracking performance may degrade significantly due to the underutilization of the available control.

The tradeoffs with respect to various values of the factor μ may be demonstrated by the following simulation example. Suppose an unstable open loop system has the following system dynamics:

$$\dot{x} = ax + bu_{max}\,sat\left(\frac{u_c}{u_{max}}\right),\ \text{where: } a = 0.5,\ b = 2,\ u_{max} = 0.47$$

If $$\delta = 0.2u_{max} \rightarrow \begin{array}{c} u_{max}^{\delta} = u_{max} - \delta = 0.8u_{max} \\ \dot{x}_m = -6(x_m - r(t)) \\ r(t) = 0.7(\sin(2t) + \sin(0.4t)) \end{array}$$

Figure 5A:
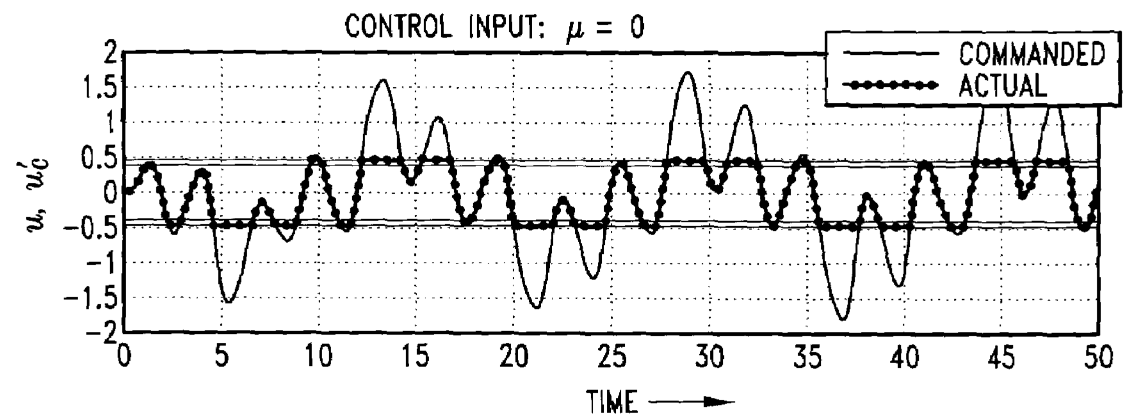
FIGS. 5*a* through 5*d* demonstrate tracking performance and input commands for various values of μ.
Figure 5B:
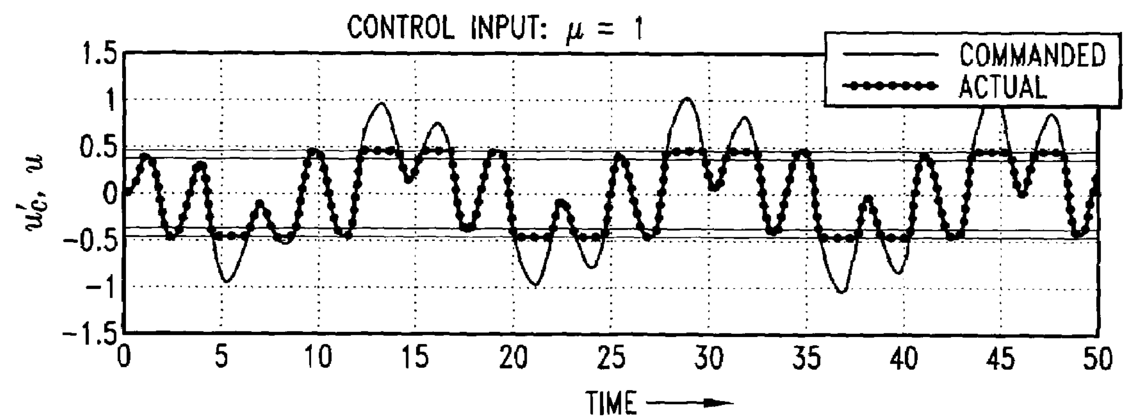
Figure 5C:
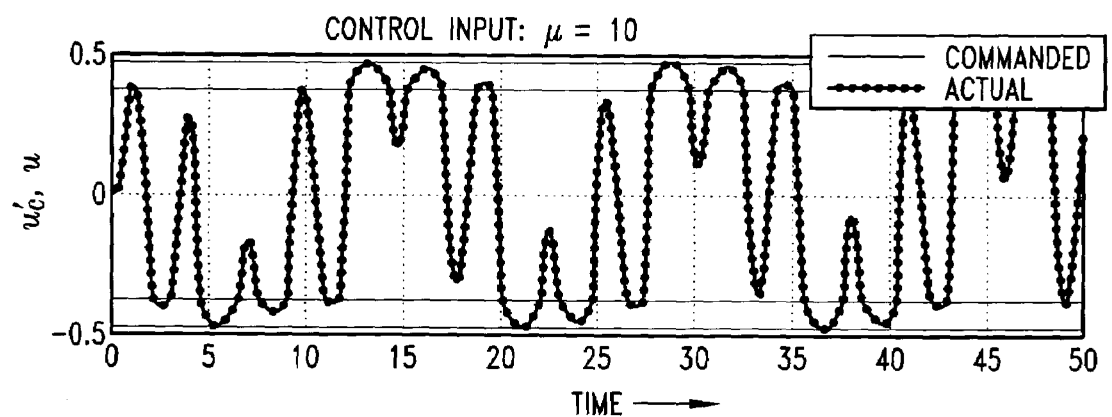
Figure 5D:
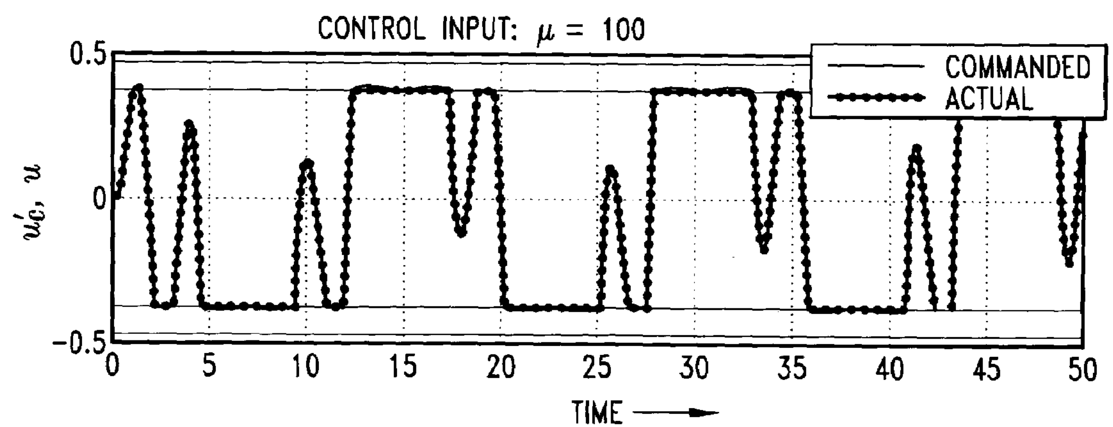

The resulting simulation data may be seen in FIGS. 5*a* through 5*d*. In FIG. 5*a*, the μ factor is set to zero such that $u_c'$ may exceed $u_{max}$. With μ equaling zero, it may be seen that modified commanded input $u_c'$ equals the conventional commanded input $u_c$ discussed with respect to FIG. 1. In FIG. 5*b*, μ equals 1. This is still less than the minimum amount set by the Lyapunov conditions discussed earlier. Thus, $u_c'$ may again exceed $u_{max}$. In FIG. 5*c*, μ equals 10, which exceeds the minimally-required amount for Lyapunov stability so that $u_c'$ does not exceed $u_{max}$. Thus, the tracking performance is significantly improved. However, μ cannot simply be increased indefinitely. For example, as seen in FIG. 5*d* for a value of μ equals 100, the tracking performance has degraded significantly in that the modified commanded input $u_c'$ has become too damped in its response to changes in external conditions.

Those of ordinary skill in the art will appreciate that many modifications may be made to the embodiments described herein. Accordingly, although the invention has been described with respect to particular embodiments, this description is only an example of the invention's application and should not be taken as a limitation. Consequently, the scope of the invention is set forth in the following claims.

We claim:

1. An adaptive control method for a system having actuators controlling control surfaces, the actuators having an input command saturation of $u_{max}$, the system having a control loop providing a linear feedback/feedforward commanded input of $u_{lin}$ wherein $u_{lin}$ is adaptively formed responsive to an error signal representing a difference between an actual state for the system and a reference state for the system, comprising:

defining a positive input command limit $u_{max}^{\delta}$ equaling $(u_{max}-\delta)$, where $0<\delta<u_{max}$;

defining a negative input command limit equaling $-u_{max}^{\delta}$;

if the absolute value of $u_{lin}$ is less than or equal to $u_{max}^{\delta}$, commanding the actuators with $u_{lin}$;

if $u_{lin}$ exceeds $u_{max}^{\delta}$, commanding the actuators with a first command input that is a function of the sum of $u_{lin}$ and a scaled version of $u_{max}^{\delta}$; and if $u_{lin}$ is less than $-u_{max}^{\delta}$; commanding the actuators with a second command input that is a function of the difference of $u_{lin}$ and a scaled version of $u_{max}^{\delta}$.

2. The adaptive control method of claim 1, wherein $u_{lin}$ is a function of both an adaptive command input and a nominal command input.

3. The adaptive control method of claim 1, wherein $u_{lin}$ is only a function of an adaptive command input.

4. The adaptive control method of claim 1, further comprising:

providing a scale factor μ, wherein the first input command equals $(1/(1+\mu))*(u_{lin}+\mu\, u_{max}^{\delta})$ and wherein the second input command equals $((1/(1+\mu))*(ulin-\mu\, u_{max}^{\delta})$.

5. The adaptive control method of claim 4, wherein μ is greater than 1.

6. The adaptive control method of claim 4, wherein μ is greater than 5.

7. The adaptive control method of claim 4, wherein μ is greater than 100.

8. The adaptive control method of claim 1, wherein the system is an aircraft.

9. The adaptive control method of claim 1, wherein the system is a spacecraft.

* * * * *

UNITED STATES PATENT AND TRADEMARK OFFICE

CERTIFICATE OF CORRECTION

PATENT NO. : 7,593,793 B2
APPLICATION NO. : 10/997548
DATED : September 22, 2009
INVENTOR(S) : Lavretsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1337 days.

Signed and Sealed this

Twenty-eighth Day of September, 2010

David J. Kappos
*Director of the United States Patent and Trademark Office*